United States Patent [19]

Strange

[11] Patent Number: 5,295,555
[45] Date of Patent: Mar. 22, 1994

[54] HYDRAULIC DEER STAND

[76] Inventor: R. Burt Strange, Rte. 2, Box 22A, Ellaville, Ga. 31806

[21] Appl. No.: 891,738

[22] Filed: Jun. 1, 1992

[51] Int. Cl.$^5$ ............................................. E06C 5/00
[52] U.S. Cl. ................................... 182/63; 182/127; 182/116
[58] Field of Search .............. 182/63, 64, 2, 102, 182/116, 127, 187, 141, 148, 62.5, 68

[56] References Cited

U.S. PATENT DOCUMENTS

| | | | |
|---|---|---|---|
| 2,777,737 | 1/1957 | Balogh | 182/2 X |
| 3,451,504 | 6/1969 | Logan | 182/2 X |
| 3,472,337 | 10/1969 | Atchey | 182/63 X |
| 3,584,705 | 6/1971 | Ruegg | 182/2 X |
| 3,768,591 | 10/1973 | Stucky et al. | 182/2 |
| 4,169,511 | 10/1979 | Brown | 182/2 X |
| 4,614,252 | 9/1986 | Tarner | 182/187 X |
| 4,787,477 | 11/1988 | Dolan | 182/127 X |
| 4,800,986 | 1/1989 | Hayes | 182/127 X |

Primary Examiner—Karen J. Chotkowski
Attorney, Agent, or Firm—Jacobson, Price, Holman & Stern

[57] ABSTRACT

A wheeled trailer chassis is provided including a flat load bed and a rear end pivotally mounted loading ramp swingable between an operative rearwardly downwardly inclined position and an upright position closing the rear of the load bed. An ATV also is provided behind which the trailer maybe trailed and the ATV is loadable over the loading ramp onto the rear portion of the load bed of the trailer. The forward portion of the trailer load bed stationarily supports a slightly rearwardly inclined upright from whose upper end the lower end of a lift boom is pivotally supported, the upper end of the lift boom having an occupant receiving receptacle pivotally supported therefrom. A parallelogram link is connected between the upright and the receptacle and hydraulic cylinders are operatively connected between the lift boom and the upright for raising and lowering the lift boom. The occupant receiving receptacle carried by the free end of the lift boom is swingable rearwardly and downwardly behind the ramp when the latter is in its upright position closing the rear of the load bed.

12 Claims, 3 Drawing Sheets

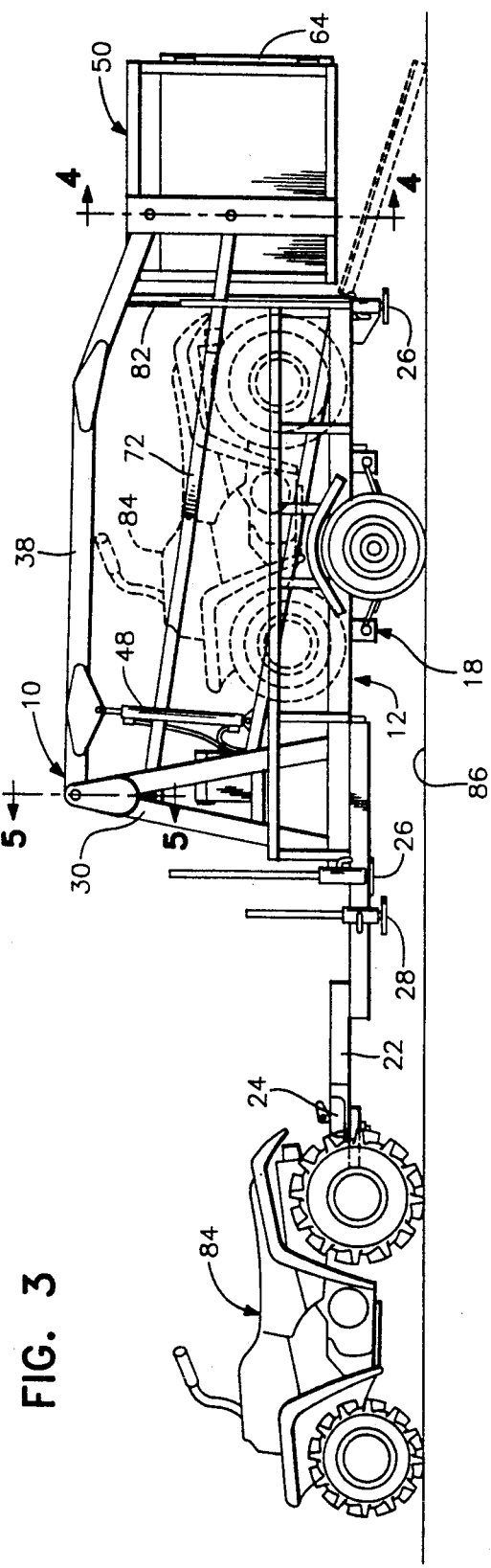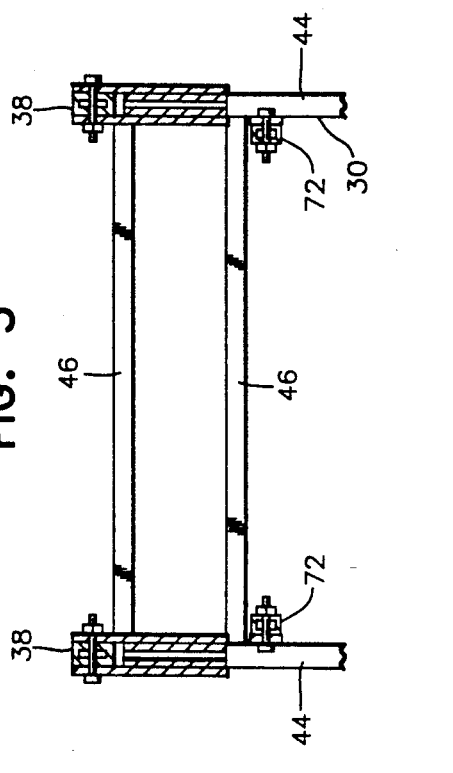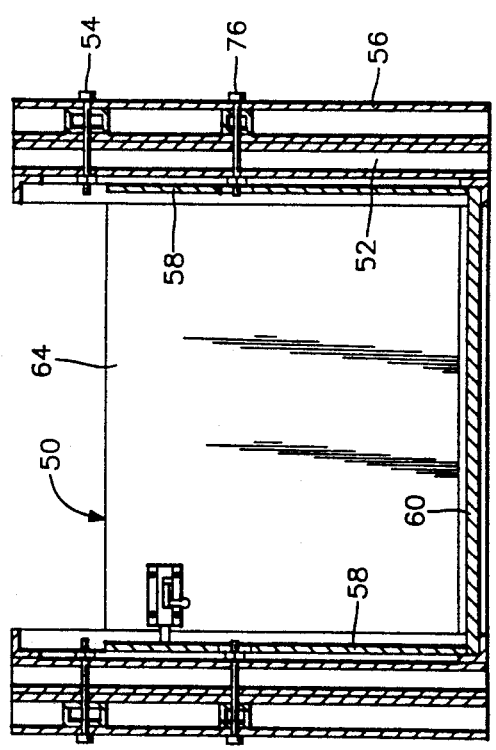

1

HYDRAULIC DEER STAND

BACKGROUND OF THE INVENTION

1. Field of the Invention

This invention relates to a lift boom-type of apparatus specifically designed for use as a deer stand and to elevate a hunter relative to the ground, although the apparatus may be utilized for lifting and supporting various other loads.

2. Description of Related Art

Various different forms of hunting blinds of the elevatable and retractable types as well as tower structures to be towed behind a pickup truck heretofore have been known. In addition, it is also known to provide a vertically extendable and retractable platform on a trailer designed to be towed behind a towing vehicle as well as to provide a hunting stand or tower used in operative association with an ATV.

However, the hydraulic deer stand of the instant invention provides a novel blind supporting and elevating structure specifically designed to be supported from the forward portion of a small flat bed trailer to be towed behind a pickup truck and wherein the blind supported therefrom, when a lowered position, is disposed to the rear of the load bed of the trailer such that the latter may be used to support and transport a ATV thereon spaced rearward of the base of the blind supporting and elevating structure, the ATV also being provided with a trailer hitch such that once a pickup truck or the like has been used to tow the trailer, blind and ATV to a hunting area, the ATV may be unloaded from the trailer, coupled to the towing tongue of the trailer and thereafter used to tow the trailer and blind to a specific hunting site.

SUMMARY OF THE INVENTION

The hydraulic deer stand of the instant invention offers a new concept in deer stands, providing an element of versatility never offered heretofore. The deer stand includes a blind which may support one to three people and which may be elevated to a height of 17-20 feet through the utilization of a pair of hydraulic cylinders. The deer stand is constructed in a manner such that the blind portion thereof may be disposed at ground level, entered by a hunter and then raised to the desired height through the utilization of remote controls.

The main object of this invention is to provide an elevatable deer stand which may be entered at ground level and which is therefore usable even by persons confined to a wheelchair or having various physical handicaps.

Another object of this invention is to provide a deer stand which is completely mobile and which may be set up in a few minutes and yet be transportable to a different location in a rapid manner.

Still another important object of this invention is to provide a deer stand of the mobile type which is easy to maneuver and which can be trailed behind a ATV, the deer stand incorporating a trailer for trailing behind the ATV and including space thereon upon which the ATV may be loaded for trailing of the stand and the ATV behind a pickup truck or the like.

Another very important object of this invention is to provide an elevatable deer stand including structure supporting and elevating the stand portion of the apparatus which may function as a ladder when the stand is in an elevated position and which therefore can be used to descend from and ascend to the stand portion of the apparatus once the apparatus has been erected.

An important of this invention is to provide an trailer-type elevatable deer stand incorporating leveling jacks and utilizing a lift structure which positions the center gravity of the entire apparatus over the center area of the base portion of apparatus.

Another important object of this invention is to provide a lift stand primarily designed for use as a deer stand, but which also may be used for supporting and lifting various different objects and which further can be removably supported from the bed of a pickup truck or, upon the addition of a three point hitch thereto, could be removably supported from a tractor three point hitch for conversion into a variety of commercial agricultural and residential uses.

A final object of this invention to be specifically enumerated herein is to provide a hydraulic deer stand in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side elevational view of the deer stand in a collapsed position and illustrating the manner in which the trailer chassis thereof may be coupled with an ATV and, ultimately in phantom lines, the manner in which a ATV maybe mounted upon the trailer for trailing both the deer stand and the ATV behind a larger draft vehicle.

FIG. 4 is an enlarged fragmentary transverse vertical sectional view taken substantially upon the plane indicated by the section line 4—4 of FIG. 3;

FIG. 5 is an enlarged fragmentary vertical sectional view taken substantially upon the plane indicated by the section line 5—5 of FIG. 3.

DESCRIPTION OF THE PREFERRED EMBODIMENT

Figure 1:
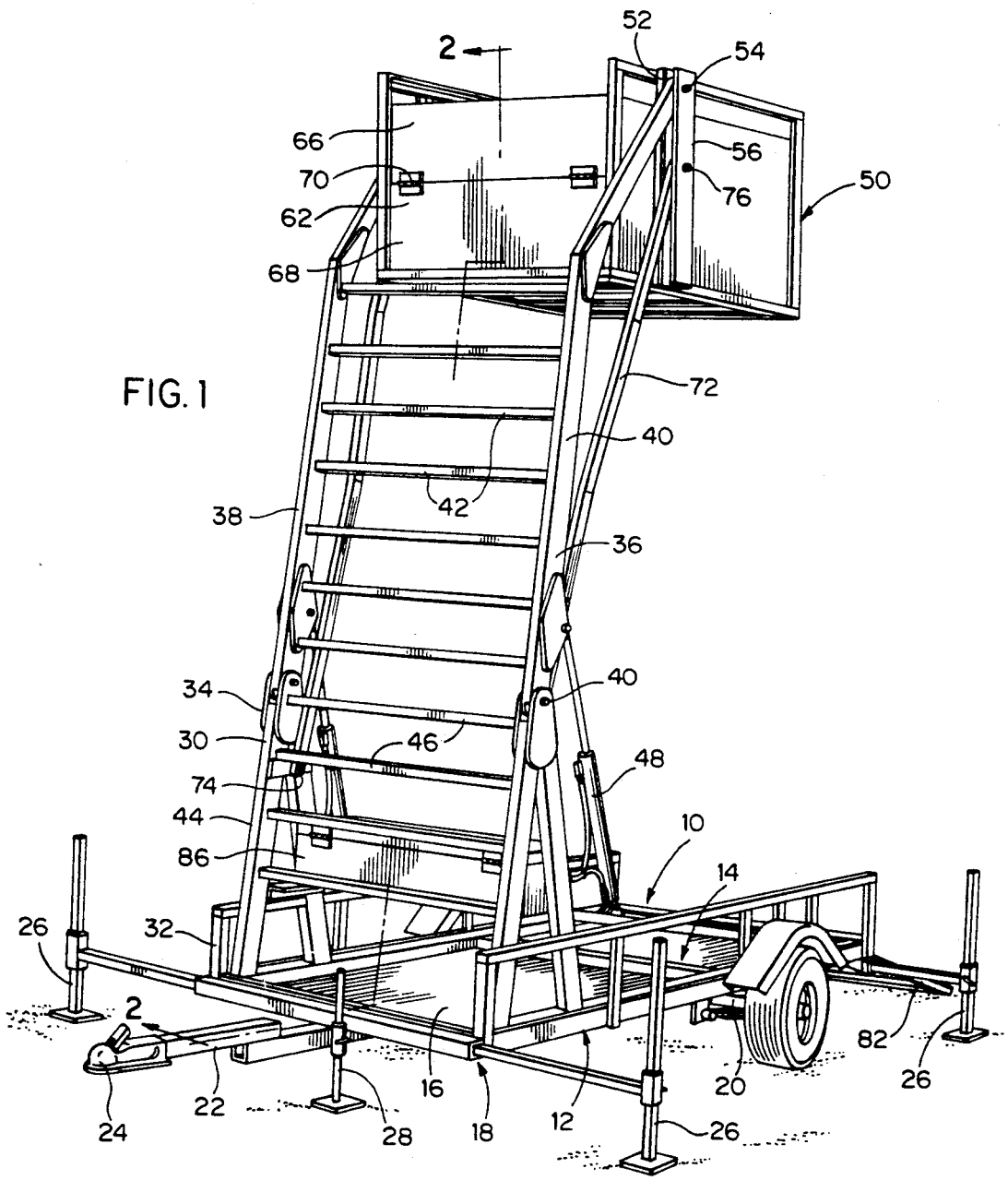
FIG. 1 is a perspective view of the deer stand in a fully erected and elevated position.

Referring now more specifically to the drawings the numeral 10 generally designates the lift of the instant invention which incorporates a base 12 consisting of a rectangular frame 14 releaseably anchored in position on the load bed 16 of a trailer chassis referred to in general by the reference numeral 18. The trailer chassis 18 includes a transverse wheeled axle 20 and a forwardly projecting trailer tongue 22 incorporating a ball hitch socket assembly 24 at its forward end. Also, the trailer chassis 18 includes laterally outwardly extendable and retractable leveling jacks 26 supported from the four corners of the trailer chassis 18. In addition, the trailer tongue 22 includes the usual jack 28.

The lift 10 additionally includes a stationary upwardly and rearwardly inclined upright 30 whose lower end 32 is secured to the frame 14 and whose upper end 34 has the lower end 36 of a lift boom 38 pivotally supported therefrom as at 40, the lift boom 38 including opposite side rails 40 interconnected by transverse rungs 42 extending and secured therebetween and spaced longitudinally of the lift boom 38. Also, the upright 30 includes corresponding opposite side rails 44 and transverse rungs 46.

Figure 2:
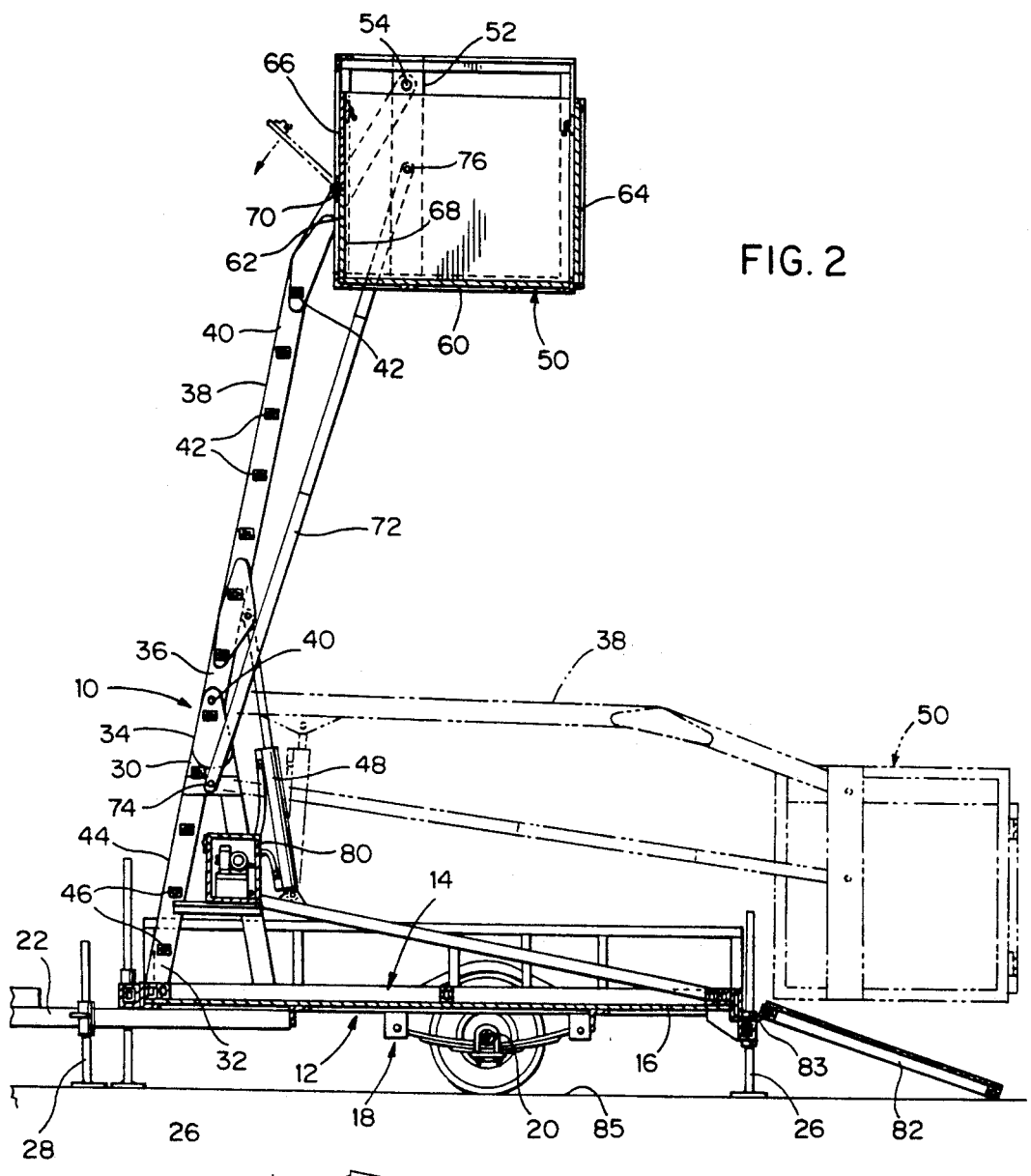
FIG. 2 is a vertical sectional view taken substantially upon the plane indicated by the section line 2—2 of FIG. 1.

A pair of hydraulic cylinders 48 are operably connected between the frame 14 and the lift boom 38 and maybe used to swing the lift boom 38 between the raised rearwardly inclined solid line position thereof illustrated in FIG. 2 and the lowered generally horizontal and rearwardly projecting position illustrated in phantom lines in FIG. 2.

The uppermost rung 42 on the lift boom 38 is spaced appreciably below the upper ends of the side rails 40 and an upwardly opening receptacle referred to in general by the reference numeral 50 includes upstanding opposite side structural members 52 pivotally supported as at 54 between the upper extremities of the side rails 40. The structural members 52 comprise tubular members and have channel members 56 secured over the outer surfaces thereof and between whose opposing flanges the upper terminal ends of the side rails 40 are pivotally secured. Thus, the upper ends of the side rails 40 are spaced slightly outward from the corresponding sides 58 of the receptacle 50. The receptacle 50 also includes a bottom wall 60, a front wall 62 and a rear wall 64, the rear wall 64 being in the form of a horizontally swingable gate and the front wall 62 including a upper half 66 thereof hingedly supported from the lower half 68 as at 70 and swingable outwardly and downwardly to a position overlying the outer side of the lower half 68.

It will be noted from FIG. 2 of the drawings that the bottom wall 60 is spaced slightly above the uppermost rung 42 when the lift boom 38 is in the uppermost position thereof. Furthermore, the upper half 66 of the front wall 62 may be swung forwardly and downwardly without interference with the uppermost rung 42. Also, from FIG. 2 of the drawings it may be seen that the lift 10 incorporates opposite side links 72 pivotally supported from the upright 30 as at 74 and pivotally anchored to the structural members 52 as at 76, the link 72 and the lift boom 38 together comprising a parallelogram linkage between the upright 30 and the receptacle 50 whereby the receptacle 50 is maintained in an upright position throughout swinging of the lift boom 38 between the upper limit position thereof illustrated in solid lines in FIG. 2 and the lower position thereof illustrated in phantom lines in FIG. 2.

The upright 30 supports a battery, electric motor and hydraulic pump power assembly 80 therefrom operatively associated with the hydraulic cylinders 48 for effecting extension and retraction thereof. Suitable remote controls (not shown) maybe provided in the receptacle 50 for remotely operating the power assembly 80.

Figure 6:
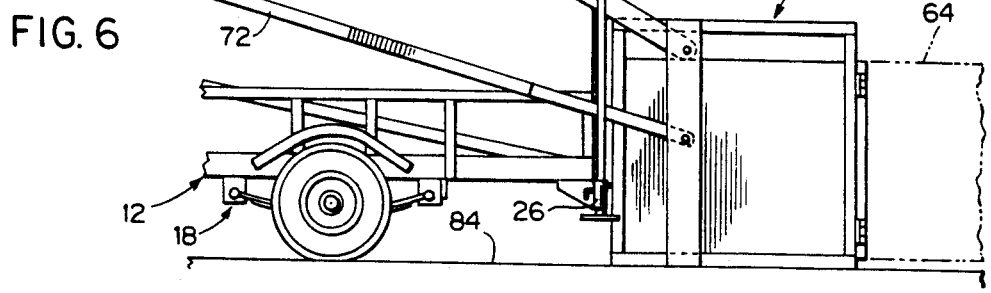
FIG. 6 is a fragmentary side elevational view of the rear portion of the trailer with the blind in a fully ground contacting lowered position.

From FIGS. 2 and 6 of the drawings it may be seen that the trailer chassis 18 is equipped with a hinged rear loading ramp 82 pivotally supported from the trailer chassis 18 as at 83. The loading ramp 82 may be utilized to load an ATV referred to in general by the reference numeral 84 onto the trailer chassis 18 behind the upright 30 when the loading ramp 82 is in the lowered position illustrated in FIG. 2 and when the receptacle 50 is in a raised position. Then, the loading ramp 82 may be swung to and releaseably retained in the upstanding position thereof illustrated in FIG. 6 of the drawings and the receptacle 50 may be swung downwardly to its lowered position illustrated in FIG. 2 disposed behind the loading ramp 82. In this manner, the lift 10 and ATV maybe towed behind a suitable draft vehicle.

Still further, the receptacle 50 may be further lowered into position in contact with the ground 86 in the manner illustrated in FIG. 6 of the drawings and the rear gate-type wall 64 maybe swung to the open position in order admit persons into the rear of the receptacle 50. Such persons maybe handicapped, disposed in a wheelchair or physically able. After such persons have entered the receptacle 50, the rear gate or wall 64 may be swung to and latched in the closed position thereof illustrated in FIG. 4 and the aforementioned remote controls (not shown) maybe actuated to cause the receptacle 50 to be elevated to the position thereof illustrated in FIG. 2.

The leveling jacks 26 are used to level the chassis 18 and are extendable outward from opposite sides of the chassis 18. Further, the jacks 26 may be carried by the frame 14.

From FIG. 3 of the drawings it maybe seen that the ATV 84 maybe used to trail the chassis 18 to a specific hunting location. Trailer chassis 18 then maybe disconnected from ATV and leveled with the jacks 26 and 28, afterwhich the receptacle 50 may be occupied and raises to an upper position such as that illustrated in FIG. 2. It is to be noted that a camouflage drape (not shown) maybe provided for camouflaging the entire lift 10 once the receptacle 50 has been raised to its upper position.

The entire assembly including the lift 10 and the ATV 84 (with the ATV 84 loaded on the trailer chassis as shown in phantom lines in FIG. 3) maybe trailed behind a full size vehicle such as sedan or pickup truck. Such a sedan or pickup truck maybe used to transport the stand 10 and the ATV 84 over roadways when traveling relatively long distances. However, once the lift 10 and ATV 84 have been trailed to the general hunting area, the trailer chassis 18 maybe uncoupled from the sedan or pickup truck, the receptacle 50 maybe raised, the ATV 84 maybe unloaded from the trailer chassis 18 and the latter then maybe coupled to the ATV and the receptacle 10 maybe swung downwardly to the lower position thereof illustrated phantom lines in FIG. 2. Thereafter, the ATV 84 maybe used to trail the lift 10 a specific hunting location.

From FIG. 1 of the drawings the ability of the upright 30 and the lift boom 38 to function as a ladder maybe readily appreciated. Further, when the upper half 66 of the front wall 62 is swung downwardly, it may be appreciated that a person standing on the upper rung 42 may readily step over the lower section 68 of the front wall 62 and into the receptacle 50.

Further it may be noted that if any form camouflage drape is used to camouflage the lift 10 when the ladder is positioned as illustrated in FIG. 1, a person or persons occupying the receptacle 50 may climb down therefrom or ascend thereto without exposing themselves to the exterior of such a camouflage drape.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A lift, said lift including an elongated horizontal base having front and rear portions, a first elongated, upstanding upright having upper and lower ends, said lower end being mounted from said front portion of said base, a lift boom having base and free ends, means pivotally mounting said base end from said upper end for angular displacement of said lift boom relative to said upright about a first horizontal transverse axis between a first raised position with said boom comprising an upward extension of said upright and a second lowered position with said free end depressed relative to said base end and swung toward said rear portion, said free end including an object support including an upright position thereof and pivotally supported therefrom for angular displacement relative to said free end about a second horizontal transverse axis substantially paralleling the first axis, said object support including a horizontal bottom wall depressed below and disposed to the rear of said rear portion when said boom is in said second position, elongated link means operatively connected between said upright and object support operative to retain said object support in at least substantially said upright position thereof during angular displacement of said lift boom between said lowered and raised positions, and power means operatively connected between said upright and lift boom for controllably angularly displacing said lift boom between said raised and lowered positions.

2. The lift of claim 1 wherein said upright and boom each include a pair of opposite side, generally parallel longitudinal members interconnected by transverse members extending and secured therebetween and substantially equally spaced along said longitudinal members, said upright and boom being generally aligned when said boom is in said raised position, said longitudinal members and transverse members defining ladder side rails and rungs, respectively, whereby a person may readily climb upwardly in a generally straight path along said upright and boom when said boom is in said raised position.

3. The lift of claim 2 wherein the longitudinal members of said boom include upper end portions which project appreciably above the uppermost transverse member thereof, said object support including an upwardly opening receptacle having peripheral side walls pivotally mounted between said upper end portions.

4. The lift of claim 3 wherein said peripheral walls include a first wall opposing and outwardly of which the uppermost rung is disposed when said boom is in said lowered position, said first wall including upper and lower portions, said upper portion being hingedly supported from said lower portion for horizontal outward and downward swinging of said upper portion relative said lower portion about a third horizontal axis, the radial extent of said upper section outwardly of said third horizontal axis being less than the spacing of said third horizontal axis from said uppermost rung.

5. The lift of claim 3 wherein said base includes a wheeled trailer chassis including front and rear ends, said upright being supported from a forward portion of said chassis, said receptacle, when in said lowered position, being disposed rearward of the rear end of said chassis, said chassis rear end including loading ramp means operatively associated therewith, an ATV behind which said trailer chassis maybe trailed and loadable upon said trailer chassis over said ramp means to a position just rearward of said forward position of said platform.

6. A lift, said lift including a base, a first elongated, upstanding upright having upper and lower ends, said lower ends being mounted from said base, a lift boom having base and free ends, means pivotally mounting said base end from said upper end for angular displacement of said lift boom relative to said upright about a first horizontal transverse axis between a first raised position with said boom comprising an upward extension of said upright and a second lowered position with said free end depressed relative to said base end, said free end including an object support including an upright position thereof and pivotally supported therefrom for angular displacement relative to said free end about a second axis substantially paralleling the first axis, elongated link means operatively connected between said upright and object support operative to retain said object support in at least substantially said upright position thereof during angular displacement of said lift boom between said lowered and raised positions, and power means operatively connected between said upright and lift boom for controllably angularly displacing said lift boom between said raised and lowered positions, said upright and boom each including a pair of opposite side, generally parallel longitudinal members interconnected by transverse members extending and secured therebetween and substantially equally spaced along said longitudinal members, said upright and boom being generally aligned when said boom is in said raised position, said longitudinal members and transverse members defining ladder side rails and rungs, respectively, whereby a person may readily climb upwardly in a generally straight path along said upright and boom when said boom is in said raised position, the longitudinal members of said boom including upper end portions which project appreciably above the uppermost transverse member thereof, said object support including an upwardly opening receptacle having peripheral side walls pivotally mounted between said upper end portions, said peripheral walls including a first wall opposing and outwardly of which the uppermost rung is disposed when said boom is in said lowered position, said first wall including upper and lower portions, said upper portion being hingedly supported from said lower portion for horizontal outward and downward swinging of said upper portion relative said lower portion about a third horizontal axis, the radial extent of said upper section outwardly of said third horizontal axis being less than the spacing of said third horizontal axis from said uppermost rung, said receptacle including a second wall opposite said first wall hingedly supported from said receptacle for swinging relative thereto between closed and open positions at least substantially closing and opening, respectively, said receptacle.

7. The lift of claim 6 wherein said second wall is swingable in a horizontal plane between said open and closed positions.

8. A wheeled trailer chassis including a front-to-rear extending load bed and a forwardly projecting trailer tongue for coupling to a towing vehicle, a lift including an elongated upright having upper and lower ends, said lower end being stationarily mounted from a forward portion of said load bed, a lift boom having base and free ends, means pivotally mounting said base end from said upper end for angular displacement about a first horizontal axis between a raised position with said boom comprising an upward extension of said upright and a lowered position with said free end depressed relative to said base end, an object support including an upright position thereof, said object support being pivotally supported from said free end for angular displacement relative to said free end about a second axis substantially paralleling said first axis, elongated link means operatively connected between said upright and object support operative to retain said object support in at least substantially said upright position thereof during angular displacement of said lift boom between said lowered and raised positions, thereof, power means operatively connected between said upright and lift boom for controllably angularly displacing said lift boom between said raised and lowered positions, said upright being supported from a forward portion of said chassis, a motorized transport vehicle including a hitch supported thereon to which said hitch means may be removably coupled, said chassis including a load bed having front and rear ends and disposed rearward of said forward portion, the rear end of said load bed including a loading ramp means pivotally supported therefrom for angular displacement between a first rearwardly and downwardly inclined loading position and a second upwardly projecting upright position closing the rear of said load bed, said vehicle being disposable on said load bed forward of said ramp means when the ramp means is in said second position, said object support, upon said lift boom being swung from said raised position to said lowered position, being swingable downwardly relative to and behind said ramp means when the latter is in said closed position.

9. The wheeled trailer chassis of claim 8 wherein the longitudinal members of said boom include upper end portions which project appreciably above the uppermost transverse member thereof, said object of support including an upwardly opening receptacle having peripheral side walls pivotally mounted between said upper end portions.

10. The wheeled trailer chassis of claim 8 said upright and boom each include a pair of opposite side, generally parallel longitudinal members interconnected by transverse members extending and secured therebetween and substantially equally spaced along said longitudinal members, said upright and boom being generally aligned when said boom is in said raised position, said longitudinal members and transverse members defining ladder side rails and rungs, respectively, whereby a person may readily climb along said upright and boom when the boom is in said raised position.

11. The wheeled trailer chassis of claim 10 wherein said peripheral walls include a first wall opposing and outwardly of which the uppermost rung is disposed when said boom is in said lowered position, said first wall including upper and lower portions, said upper portion being hingedly supported from said lower portion for horizontal outward and downward swinging of said upper portion relative said lower portion about an horizontal axis, the radial extent of said upper section outwardly of the last mentioned axis being less than the spacing of the last mentioned axis from said uppermost rung.

12. A lift, said lift including an elongated horizontal base having front and rear portions, a first elongated, upstanding upright having upper and lower ends, said lower end being mounted from said front portion of said base, a lift boom having base and free ends, means pivotally mounting said base end from said upper end for angular displacement of said lift boom relative to said upright about a first horizontal transverse axis between a first raised position with said boom comprising an upward extension of said upright and a second lowered position with said free end depressed relative to said base end and swung toward said rear portion, said free end including an object support mounted thereon, said upright and boom each including a pair of opposite side, generally parallel longitudinal members interconnected by transverse members extending and secured therebetween and substantially equally spaced along said longitudinal members, said upright and boom being generally aligned when said boom is in said raised position, said longitudinal members and transverse members defining ladder side rails and rungs, respectively, whereby a person may readily climb along said upright and boom when the boom is in said raised position in order to gain access to said object support.

* * * * *